United States Patent
Exline

(10) Patent No.: US 7,246,833 B2
(45) Date of Patent: Jul. 24, 2007

(54) ENERGY ABSORBING SYSTEM FOR ATTACHING A TRAILING DEVICE TO A VEHICLE

(75) Inventor: Matthew M. Exline, Attica, MI (US)

(73) Assignee: Romeo-Rim, Inc., Romeo, MI (US)

( * ) Notice: Subject to any disclaimer, the term of this patent is extended or adjusted under 35 U.S.C. 154(b) by 45 days.

(21) Appl. No.: 10/932,468

(22) Filed: Sep. 1, 2004

(65) Prior Publication Data

US 2005/0057052 A1  Mar. 17, 2005

Related U.S. Application Data

(60) Provisional application No. 60/503,232, filed on Sep. 16, 2003.

(51) Int. Cl.
*B60R 9/00* (2006.01)
(52) U.S. Cl. .................. 293/117; 414/462; 224/502; 224/512
(58) Field of Classification Search .............. 224/488, 224/502, 495, 509, 511, 512, 516, 518, 519, 224/521, 924, 42.32; 293/117; 410/2, 3, 410/30; 414/462
See application file for complete search history.

(56) References Cited

U.S. PATENT DOCUMENTS 5,560,666 A * 10/1996 Vieira et al. ................. 296/3
6,502,730 B2 * 1/2003 Johnson \* cited by examiner

*Primary Examiner*—Stephen Gordon
(74) *Attorney, Agent, or Firm*—Renner, Kenner, Greive, Bobak, Taylor & Weber

(57) ABSTRACT

A system (10) for attaching a trailing device (12) to a vehicle includes a bumper assembly (11) having a back structure (13) which carries an energy absorbing module (14). The system (10) includes receiver assemblies (60) which are attached to the bumper back structure (13) and which include a tube (62). The system (10) also includes carrier assemblies (40) which carry the trailing device (12) and which each includes an arm end (42) slidably received in the tubes (62). Shear pins (73) attach the arm ends (42) to the tubes (62) and upon impact to the trailing device (12), a leg (74) of each pin (73) can be sheared allowing relative movement between the arm ends (42) and the tubes (62). As a result, the carrier assemblies (40) contact the energy absorbing bumper module (14) to absorb some of the energy of the impact. As the arm ends (42) begin to move in the other direction through tubes (62), by virtue of the rebound effect of the energy absorbing module (14), another leg (75) of each pin (73) engages the tube (62) to stop the rebounding movement.

10 Claims, 6 Drawing Sheets

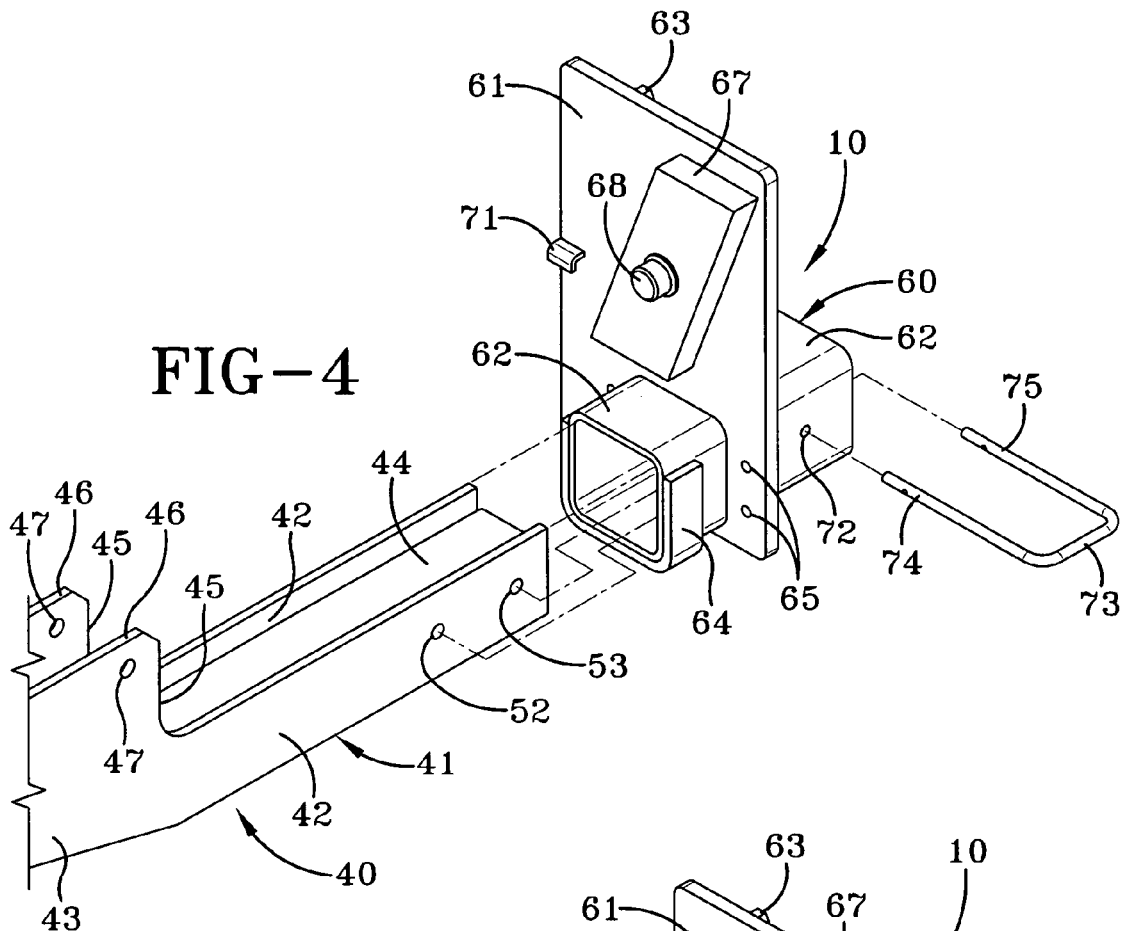
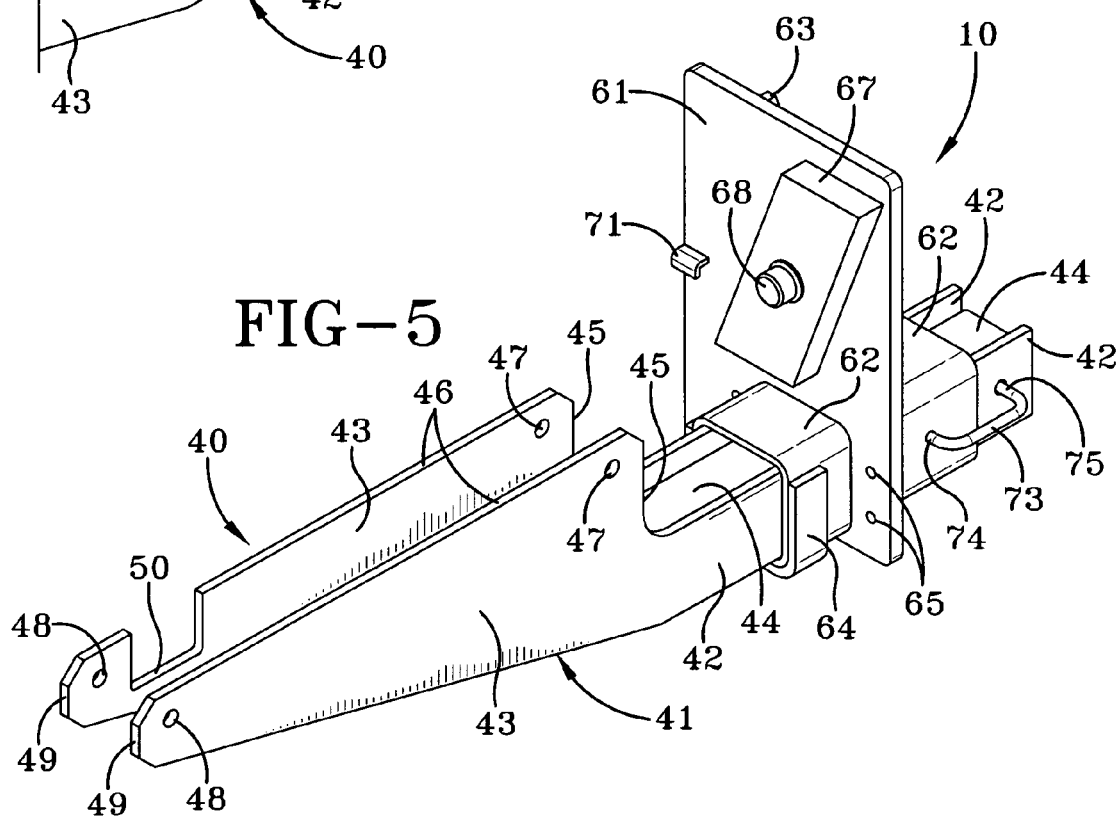

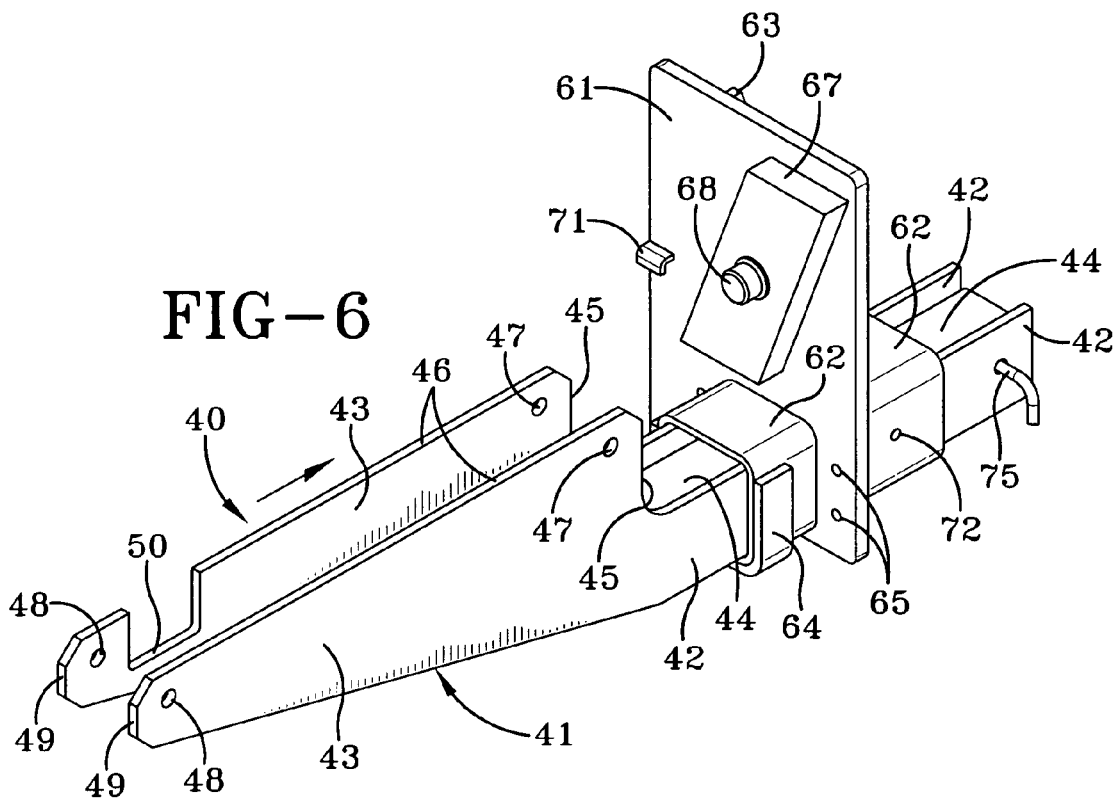
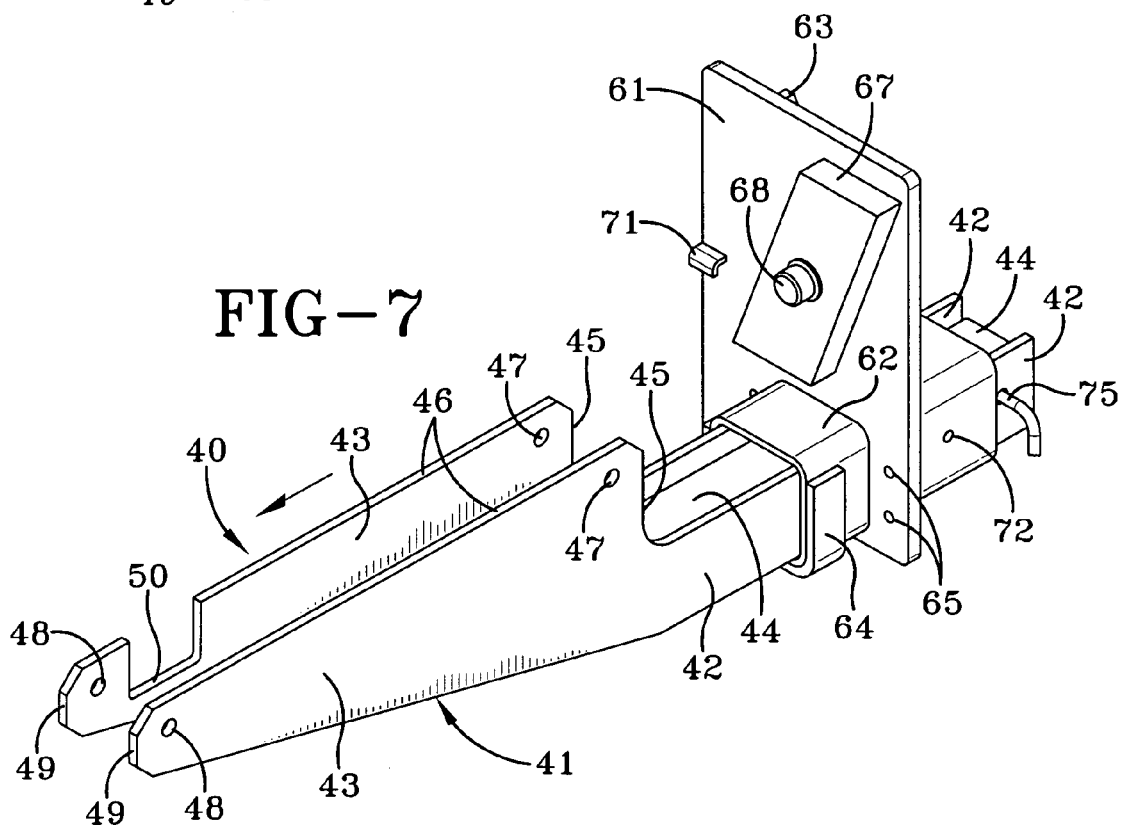

ENERGY ABSORBING SYSTEM FOR ATTACHING A TRAILING DEVICE TO A VEHICLE

CROSS-REFERENCE TO RELATED APPLICATION

This application claims the benefit of U.S. Provisional Patent Application No. 60/503,232 filed Sep. 16, 2003.

TECHNICAL FIELD

This invention relates to a system for attaching a trailing device to a vehicle having an energy absorbing bumper. More particularly, this invention relates to a system for attaching a trailing device to the energy absorbing bumper so that upon an impact on the trailing device, the energy absorbing bumper will act to protect the trailing device.

BACKGROUND ART

Many vehicles are equipped with energy absorbing bumpers which protect the vehicle and its occupants from low speed collisions and which reduce the potential damage of high speed collisions. However, when such a vehicle is carrying or towing a trailing device, such as a trailer mounted to the vehicle by a trailer hitch, neither the trailing device nor the vehicle or its occupants are protected by the energy absorbing bumper. Thus, even a small impact on the trailing device not only can damage the trailing device, but also the force of such an impact is transferred directly to the vehicle, even if the vehicle has an energy absorbing bumper.

Thus, the need exists to take advantage of the protection afforded by an energy absorbing bumper when attaching a trailing device to a vehicle.

DISCLOSURE OF THE INVENTION

It is thus an object of the present invention to provide a mounting system for a vehicle trailing device which advantageously utilizes the energy absorbing bumper of a vehicle to absorb energy from impact to the device being towed by or otherwise trailing the vehicle.

It is another object of the present invention to provide a system, as above, which protects the trailing device, the vehicle, and its occupants from damage which might occur if the trailing device is impacted.

It is a further object of the present invention to provide a system, as above, in which the connection between the vehicle and the trailing device is not destroyed by virtue of the impact.

These and other objects of the present invention, as well as the advantages thereof over existing prior art forms, which will become apparent from the description to follow, are accomplished by the improvements hereinafter described and claimed.

In general, a system for attaching a trailing device to a vehicle includes an energy absorbing bumper assembly adapted to be carried by the vehicle. A receiver is attached to the bumper assembly, and it includes a tube to receive the arm of a carrier assembly which is adapted to carry the trailing device. A pin is received through the arm and the tube to position the arm and the tube relative to each other. The pin is capable of shearing upon an impact upon the trailing device to allow relative movement between the arm and the tube so that the carrier assembly can engage the energy absorbing bumper assembly.

In accordance with another aspect of the present invention, an apparatus for attaching a trailing device to a vehicle having an energy absorbing bumper includes a receiver adapted to be attached to the bumper. A carrier assembly is adapted to carry the trailing device and has a portion which is slidably received in the receiver. A pin positions the carrier assembly and the receiver relative to each other. The pin is capable of shearing upon impact on the trailing device to allow relative movement between the carrier assembly and the receiver so that the carrier assembly can engage the bumper.

The present invention also contemplates a method of utilizing an energy absorbing bumper on a vehicle to absorb the energy of impact on a trailing device carried by the vehicle. The method includes the steps of attaching a receiver to the bumper, attaching the trailing device to a carrier assembly, inserting at least a portion of the carrier assembly into the receiver, and inserting a leg of a pin through the carrier assembly and the receiver. The leg is capable of shearing upon impact on the trailing device whereby the carrier assembly moves relative to the receiver to engage the bumper.

A preferred exemplary mounting system incorporating the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 4 is a fragmented, exploded, perspective view of a portion of a mounting system made in accordance with the present invention.

FIG. 5 is a perspective view of the assembled portion of the mounting system of FIG. 4 showing its components in a normal position whereby the bumper would be carrying the trailing device.

FIG. 6 is a view similar to FIG. 5 but showing the components in a position after an impact upon the trailing device.

FIG. 7 is a view similar to FIG. 4 but showing the condition of the components sequentially following FIG. 6.

PREFERRED EMBODIMENT FOR CARRYING OUT THE INVENTION

A mounting system made in accordance with the present invention is indicated generally by the numeral 10 and best shown in FIGS. 3-7. System 10 is adapted to be carried by the bumper assembly, generally indicated by the numeral 11, of a vehicle and is adapted to carry a trailing device generally indicated by the numeral 12.

Figure 3:
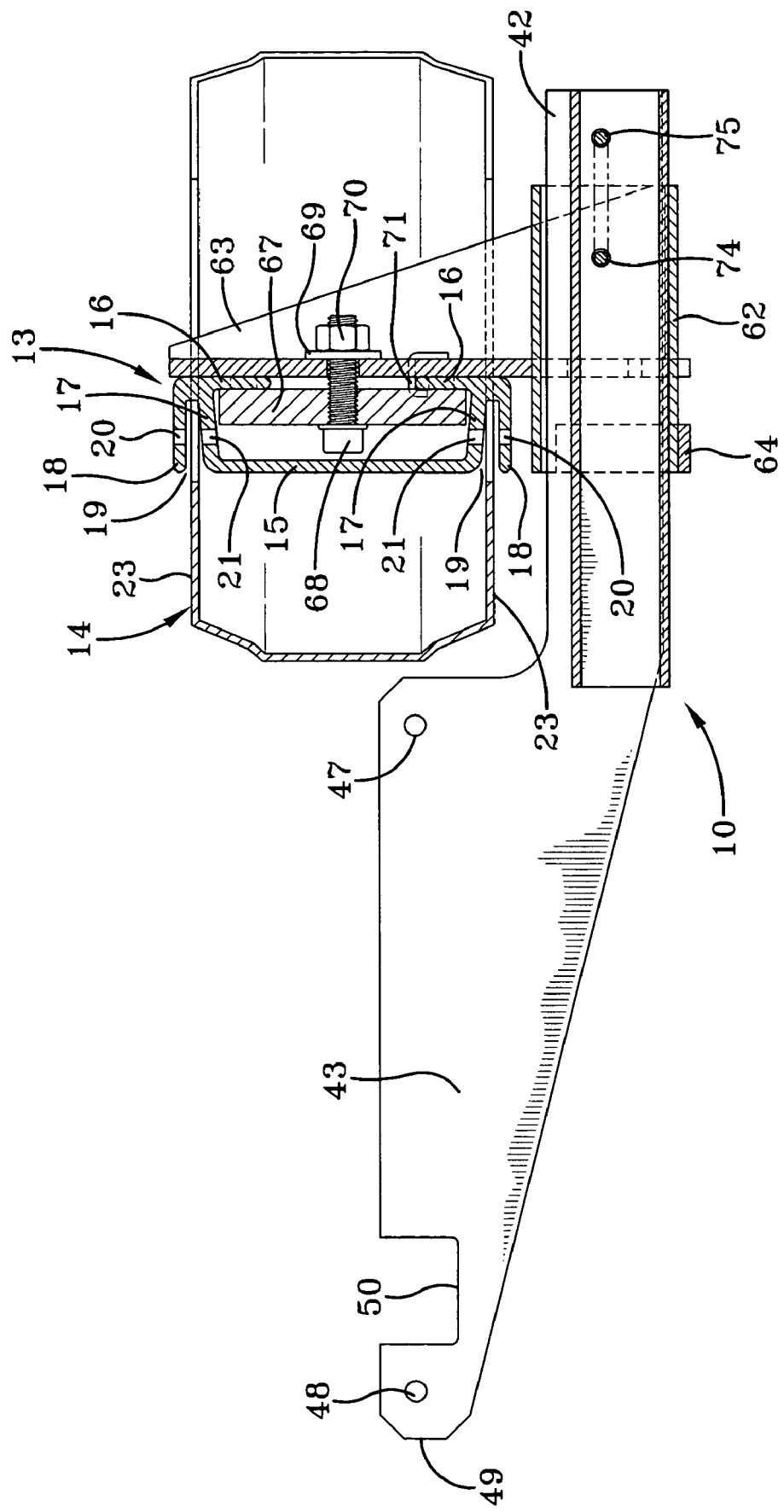
FIG. 3 is a sectional view taken substantially along line 3-3 of FIG. 2.

As best shown in FIG. 3, bumper assembly 11 includes a back structure, generally indicated by the numeral 13, which is adapted to be bolted to or otherwise attached to a vehicle, and which carries an energy absorbing module generally indicated by the numeral 14. Module 14 is made of a rubber or plastic material which is designed to absorb an impact of up to five miles per hour without damage to the vehicle. A bumper assembly which is very suitable for this application is a bumper assembly sold by Romeo-Rim, Inc. of Romeo, Mich., under the registered trademark HELP.

Back structure 13 is preferably made of a metallic material and includes a plate 15 which extends generally along the length of bumper assembly 11 and which generally approximates the height of bumper assembly 11 as well. Back structure 13 also includes vertically spaced flanges 16 which are laterally spaced from plate 15 and which are carried by arms 17 which extend rearwardly from near upper and lower ends of plate 15. Flanges 16 are adapted to be mounted to a vehicle in a conventional manner not shown herein. Wings 18 are formed in back structure 13 and are vertically spaced from arms 17 to form pockets 19 therebetween. Aligned holes 20 and 21 are formed in wings 18 and arms 17, respectively, to assist in mounting bumper assembly 11 to back structure 13 in a manner now to be described.

Bumper module 14 includes an impact face 22 with upper and lower bumper walls 23 extending rearwardly from the ends of face 22. As shown in FIG. 3, the ends of bumper walls 23 are received in pockets 19 and fasteners (not shown) are received through holes 20 and 21 and through walls 23 to maintain module 14 on back structure 13.

The concept of system 10 is adaptable to any type of trailing device which might be desired to be carried or towed by a vehicle. For example, in its simplest forms, the trailing device could be a conventional trailer or bicycle rack. The trailing device 12 shown, however, is specially configured to carry a mini-vehicle such as that known as a SEGWAY vehicle and utilized by the U.S. Post Office to deliver mail. Thus, in the instance shown, bumper assembly 11 could be mounted on the rear of a postal truck which, by means of system 10, safely transports a SEGWAY vehicle on trailing device 12 for use in the field to deliver mail.

This specially configured trailing device 12 thus includes a platform portion generally indicated by the numeral 24, and a ramp portion generally indicated by the numeral 25. Ramp portion 25 includes spaced U-shaped tracks 26 which are interconnected by support members 27. One end of tracks 26 is shown as being hinge connected, as at 28, to one end of U-shaped tracks 29 formed in a platform portion 24. As such, portions 24 and 25 are pivotable relative to each other from a position where the other end of tracks 26 may touch the ground to a position where tracks 26 and 29 are horizontally aligned and held in that orientation by a latching device (not shown). Platform tracks 29 are carried by spaced beams 30 with a crossbeam 31 extending between beams 30.

Figure 1:
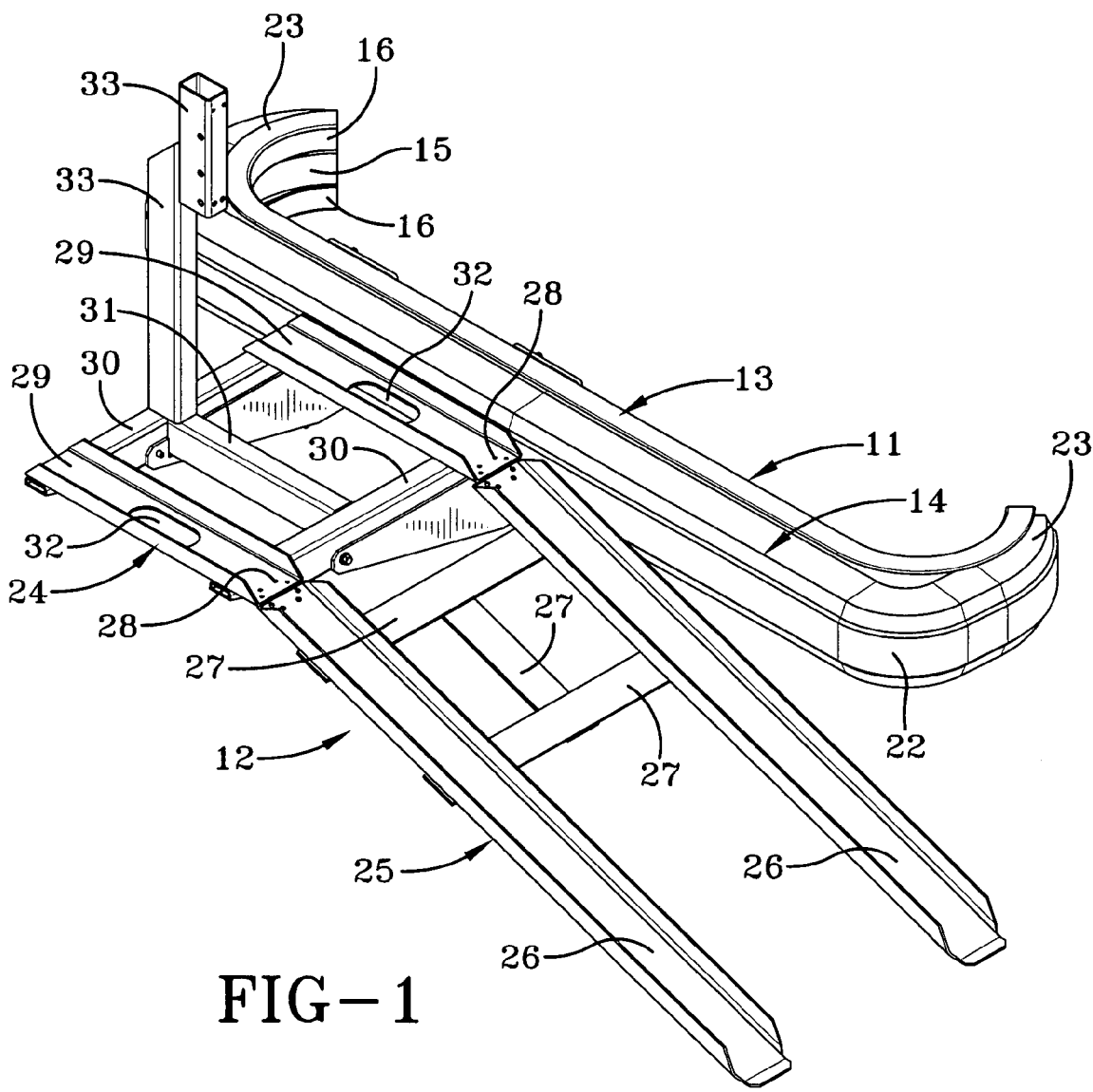
FIG. 1 is somewhat schematic perspective view showing a trailing device being carried by a bumper, and showing only a portion of the mounting system of the present invention.

With ramp portion 25 pivoted downwardly with respect to platform portion 24, as shown in FIG. 1, the wheels of a vehicle, such as the SEGWAY vehicle, may ride up ramp tracks 26 and into platform tracks 29. Apertures or recesses 32 in tracks 29 can be provided to positively locate the wheels of the vehicle in the proper position on platform portion 24. A vertical post assembly 33 may be provided to restrain, or otherwise be tied to, the handlebar structure of the SEGWAY vehicle.

The system 10 for mounting trailing device 12 relative to bumper assembly 11 includes two carrier assemblies generally indicated by the numeral 40. Each carrier assembly 40 includes spaced bracket arms generally indicated by the numeral 41. Each bracket arm 41 is preferably made up of two plates each having an arm end 42 and a support end 43. The arm ends 42 are welded to or otherwise attached to, and thereby spaced by, a support tube 44. The support end 43 of each plate of each arm 41 includes a generally vertical contact surface 45 extending upwardly from the end of arm end 42 to a generally horizontal support surface 46. Each support end 43 of each plate is provided with a first set of aligned apertures 47 near contact surface 45 and a second set of aligned apertures 48 near the nose ends 49 of support ends 43 of the plates. In addition, the support end 43 of one of the plates of each bracket arm 41 is notched, as at 50.

Figure 1A:
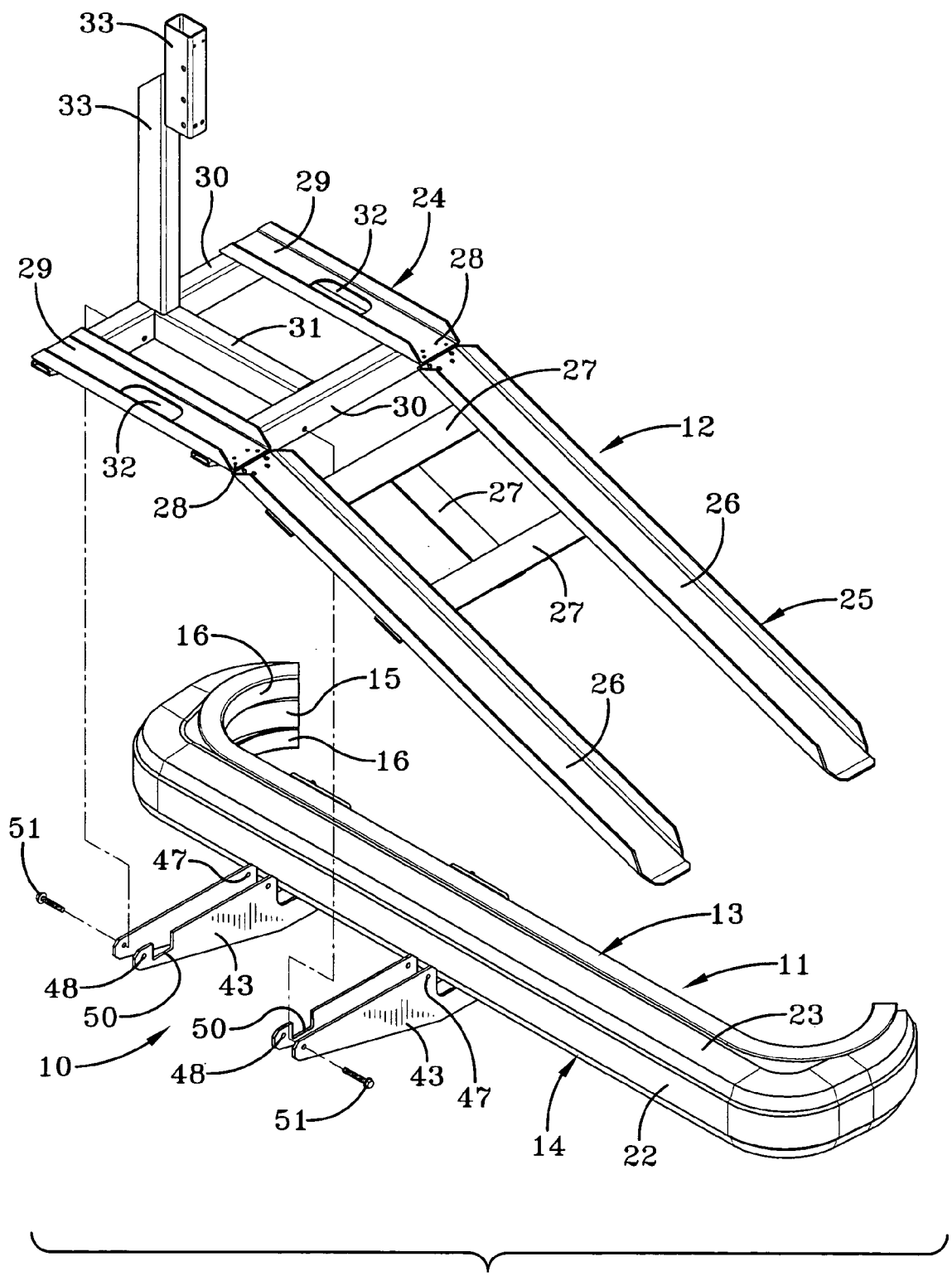
FIG. 1A is an exploded view of the bumper and trailing device shown in FIG. 1.

The support surface 46 of the two plates of each bracket arm 41 carry the trailing device 12, specifically the platform portion 24 of trailing device 12. To that end, the beams 30 are received between the support ends 43 of the bracket arm plates and maintained therein by fasteners 51 (FIG. 1A) received through apertures 48. Additional fasteners (not shown) are received through apertures 47 and through beams 30. Crossbeam 31 of trailing device 12 is received in notches 50 of adjacent bracket arms 41. As a result, carrier assembly 40 supports trailing device 12 with tracks 29 of platform 24 resting on support surfaces 46 of the support end 43 of the plates.

Figure 2:
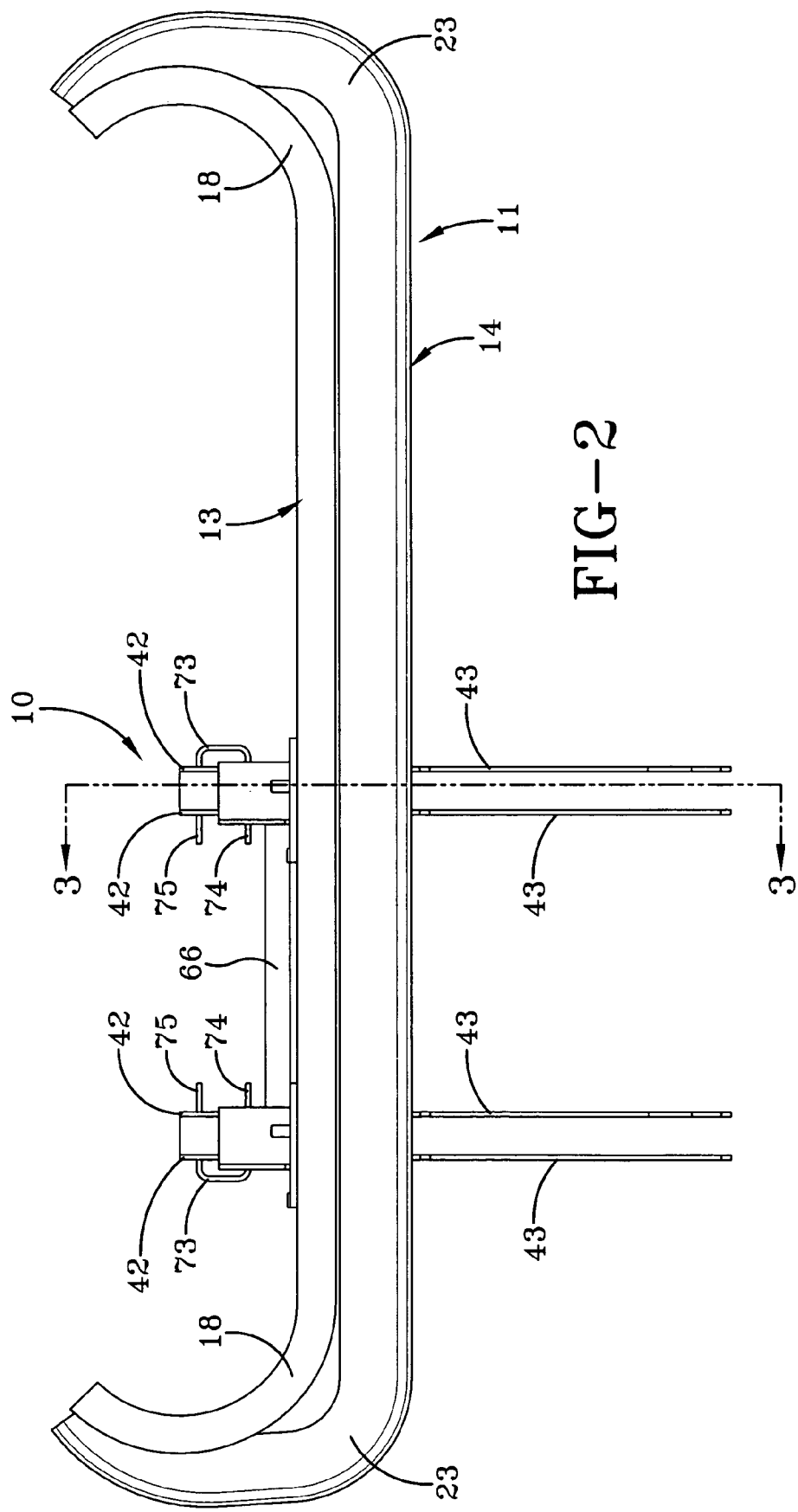
FIG. 2 is a somewhat schematic top plan view of a bumper, trailing device, and mounting system of the present invention.

The arm end 42 of each plate and the support tube 44 are provided with a first set of aligned holes 52 and a second set of aligned holes 53. As will hereinafter be described, such enables each carrier assembly 40 to interact with a receiver assembly, generally indicated by the numeral 60, which is part of system 10. A receiver assembly 60 is provided for each carrier assembly 40 and each receiver assembly 60 is carried by bumper back structure 13 and includes a receiver plate 61 having a hollow tube 62 extending therethrough. A gusset plate 63 may extend between receiver plate 61 and a portion of tube 62 to provide additional support at one end of tube 62, and a collar 64 may be provided around tube 62 for additional support at the other end of tube 62. Apertures 65 are provided in each receiver plate 61 near the edge adjacent to the other receiver plate 61 of system 10 so that receiver plates 61 may be tied together and rigidly spaced by a spacing beam 66 (FIG. 2). Thus, fasteners (not shown) are provided through apertures 65 of each receiver plate 61 to attach receiver plates 61 to beam 66.

Receiver assembly 60 also includes a swing plate 67 which allows receiver assembly 60 to be attached to back structure 13 of bumper assembly 11. A bolt 68 extends through and is attached, as by welding, to swing plate 67. Bolt 68 is slidably received through receiver plate 61 and receives a washer 69 and nut 70 on the threaded end thereof. To install receiver assembly 60 on bumper back structure 13, swing plate 67 is fed between spaced flanges 16 and then initial rotation of nut 70 rotates swing plate 67 approximately ninety degrees so that, as shown in FIG. 3, swing plate 67 interferes with flange 16. Then further tightening of nut 70 maintains receiver assembly 60 attached to bumper back structure 13. For the convenience of the assembler of system 10, a hook 71 may be provided on receiver plate 61 to engage a flange 16 of back structure 13 so that receiver assembly 60 is held in place without the need for the assembler to hold the same while manipulating swing plate 67.

With each receiver assembly 60 so attached to bumper back structure 13, each bracket arm 41 of carrier assembly 40 may now be attached to a receiver assembly 60 to complete system 10. As shown in FIG. 3, tube 62 of receiver assembly 60 is positioned below bumper assembly 11 when receiver assembly 60 is attached to bumper back structure 13. To attach a bracket arm 41 to a receiver assembly 60, arm end 42 of bracket arm 41 is fed underneath bumper assembly 11 through tube 62 until holes 52 are aligned with aligned apertures 72 formed through both sides of tube 62. Then a shear pin 73 having legs 74 and 75 is utilized to maintain end 42 of bracket arm 41 positioned in tube 62. To that end, leg 74 of pin 73 is positioned through holes 52 and apertures 72, and leg 75 of pin 73 is positioned through holes 53 of arm end 42 which is exposed through tube 62. Such is the assembled condition of arm 41 and receiver assembly 60 as shown in FIG. 5.

With two receiver assemblies 60 and bracket arms 41 so attached as shown, for example, in FIG. 2, trailing device 12 may be positioned on support end 43 of bracket arms 41, as previously described. Then, upon an impact on trailing device 12, bracket arms 41 will begin to move through tubes 62 (to the right as viewed in FIG. 3) and legs 74 of shear pins 73 will be sheared as shown in FIG. 6. Pins 73 are preferably made of one quarter inch diameter A36 steel which will shear upon receiving a force of six thousand pounds. Such shearing of legs 74 absorbs some of the energy of the impact but continued movement of arms 41 through tubes 62 causes impact surfaces 45 of the support end 43 of each plate of each bracket arm 41 to engage the impact face 22 of bumper module 14 where more energy of the impact is absorbed. At this point, bracket arms 41 will begin to rebound, that is, move to the left as viewed in FIG. 3. However, a total release of the trailing device 12 is prevented because legs 75 of pins 73 will engage the rear edges of tubes 62 as shown in FIG. 7 to maintain arm ends 42 of bracket arms 41 within tubes 62.

As a result, the energy of an impact is absorbed and system 10 has prevented, or at least minimized, damage to the trailing device, the vehicle and its occupants, thus substantially improving the art and otherwise accomplishing the objects of the invention.

What is claimed is:

1. A system for attaching a trailing device to a vehicle comprising an energy absorbing bumper assembly adapted to be carried by the vehicle, a receiver attached to said bumper assembly and having a tube, a carrier assembly adapted to carry the trailing device and having an arm slidably received in said tube, and a pin received through said arm and said tube to position said arm and said tube relative to each other, said pin defining means for shearing upon sufficient impact on the trailing device to allow relative movement between said arm and said tube so that said carrier assembly will engage said energy absorbing bumper assembly.

2. The system of claim 1 wherein said means includes a pin which includes a first leg which is designed to shear upon sufficient impact and a second leg maintaining said arm in said tube.

3. The system of claim 1 wherein said receiver includes a plate carrying said tube.

4. The system of claim 3 wherein said receiver includes a swing plate pivotally attached to said plate, said swing plate being pivoted relative to said plate to engage said bumper assembly.

5. The system of claim 1 wherein said carrier assembly includes a second arm spaced from said arm, each said arm having an arm end and a support end, a second tube, said arm ends being received in said tubes and said support ends carrying the trailing device.

6. The system of claim 5 wherein each said support end has a contact surface positioned adjacent to said bumper assembly and is designed to engage said bumper assembly when said means has allowed relative movement between respective ones of said arms and said tubes.

7. The system of claim 1 wherein the trailing device includes a platform portion adapted to be attached to said carrier assembly.

8. The system of claim 7 wherein the trailing device includes a ramp portion pivotally attached to the platform portion.

9. A system for attaching a trailing device to a vehicle comprising an energy absorbing bumper assembly adapted to be carried by the vehicle, a receiver attached to said bumper assembly and having a tube, a carrier assembly adapted to carry the trailing device and having an arm slidably received in said tube, and a pin received through said arm and said tube to position said arm and said tube relative to each other, said pin including a first leg which is capable of shearing upon an impact on the trailing device to allow relative movement between said arm and said tube so that said carrier assembly can engage said energy absorbing bumper assembly, and a second leg maintaining said arm in said tube.

10. A system for attaching a trailing device to a vehicle comprising an energy absorbing bumper assembly adapted to be carried by the vehicle, a receiver attached to said bumper assembly and having a tube and a plate carrying said tube, said receiver including a swing plate pivotally attached to said plate, said swing plate being pivoted relative to said plate to engage said bumper assembly, a carrier assembly adapted to carry the trailing device and having an arm slidably received in said tube, and a pin received through said arm and said tube to position said arm and said tube relative to each other, said pin being capable of shearing upon an impact on the trailing device to allow relative movement between said arm and said tube so that said carrier assembly can engage said energy absorbing bumper assembly.

* * * * *